United States Patent Office 3,297,143
Patented Jan. 10, 1967

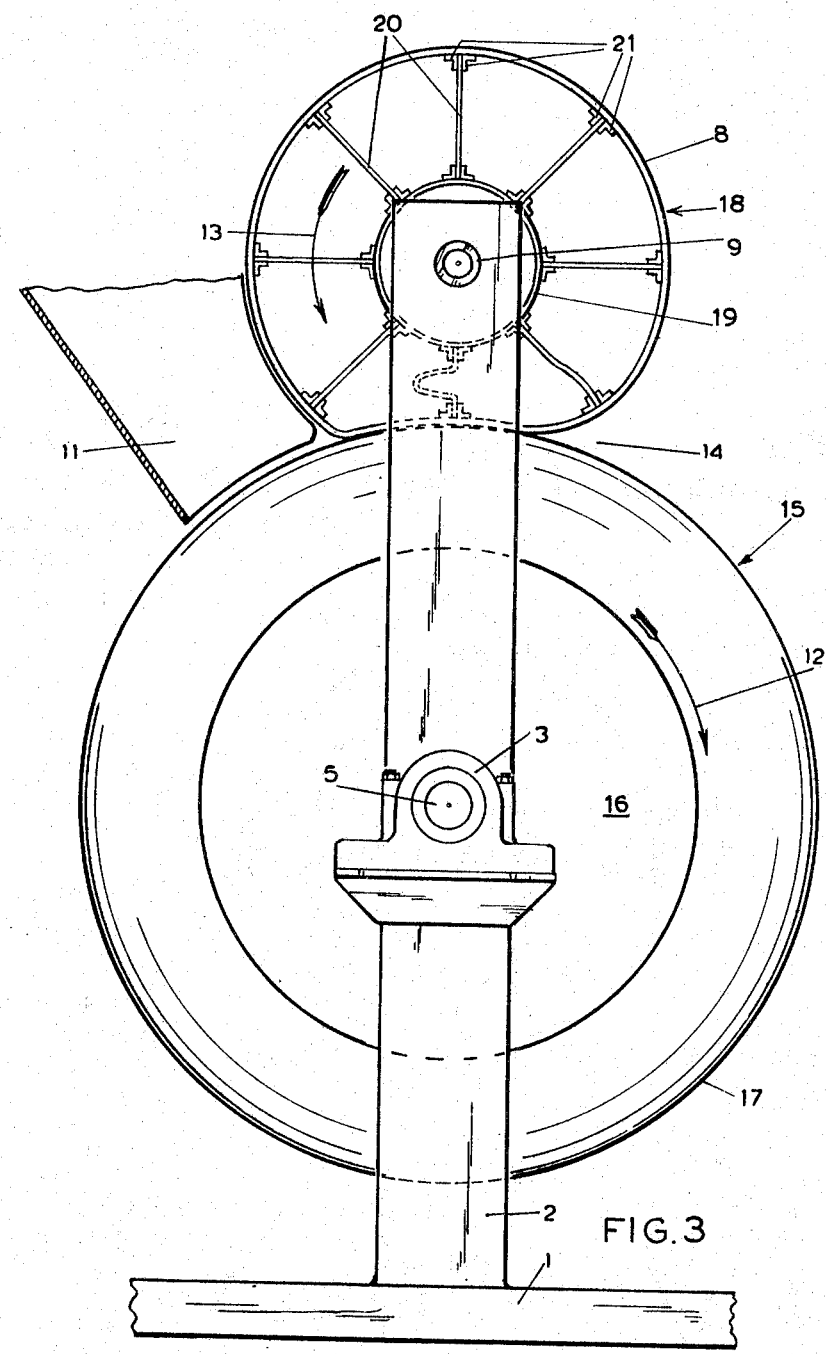

3,297,143
APPARATUS FOR CONVEYING OR STACKING BULK MATERIALS
Cornelis Doyer, Wladimirlaan 6A, Bussum, Netherlands
Filed Oct. 13, 1965, Ser. No. 495,390
7 Claims. (Cl. 198—128)

The present invention relates to an apparatus for handling bulk particulate materials, such as sand, rubble, ores, grain, artificial fertilizer and similar materials.

In particular, the invention relates to apparatus for throwing or transporting bulk particulate material.

An object of this invention is to provide an economical yet effective conveying apparatus especially adapted for conveying irregular, abrasive materials having a greatly varying particle size, such as rubble, broken bricks, minerals, such as ores and local, and similar materials.

A still further object is the provision of a conveying apparatus which is cheap to manufacture, inexpensive to operate and easily movable.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 3 is a side view of a modified form of the invention.

Figure 1:
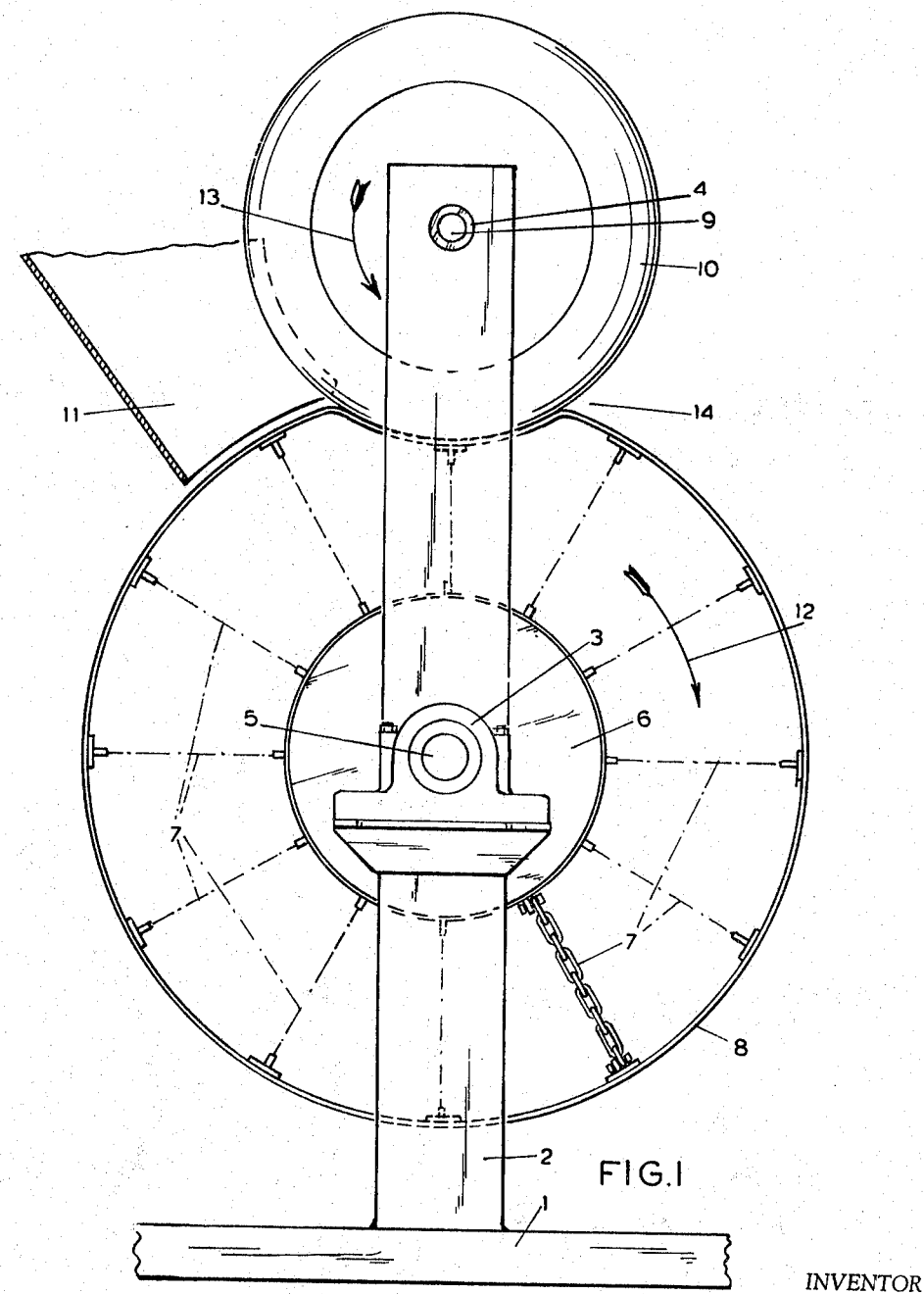
FIG. 1 is a side elevation of the apparatus and showing the feed means in section.
Figure 2:
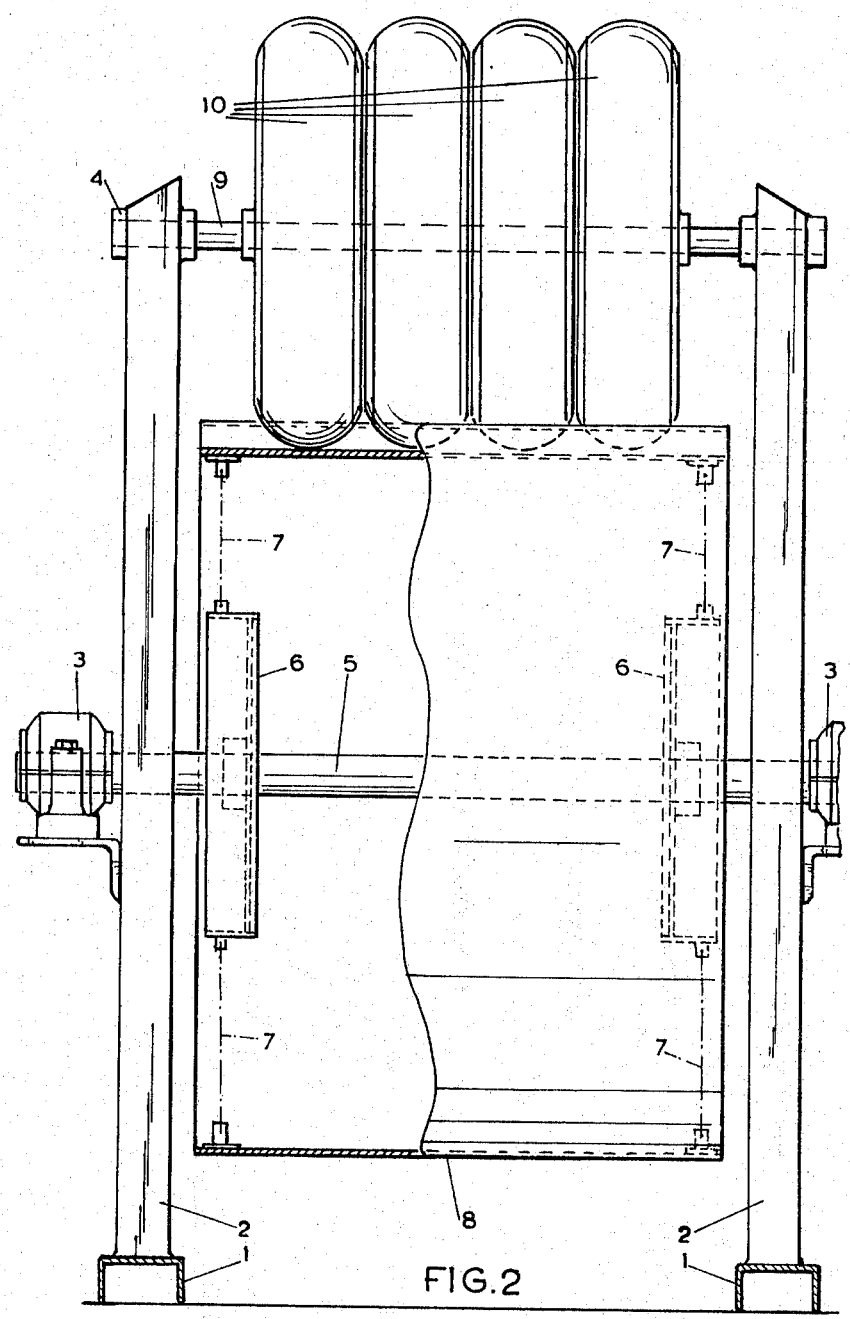
FIG. 2 is a front view, partly in vertical section, of the apparatus of FIG. 1.

Referring now with particularity to the drawings, a suitable framing 1 is provided, which includes a pair of uprights 2, each supporting two bearings 3 and 4 respectively. The bearings 3 support the rotatable axle 5 to which is attached a pair of spaced discs 6. The axle may be rotatably driven in any suitable fashion. The discs 6 are each provided around their periphery with a plurality of chains 7 connecting the discs with a flexible heavy continuous belt 8. The chains all have such a length that on rotation of the axle 5 the belt 8 will assume a cylindrical form under influence of centrifugal force. An axle $a$ is rotatably mounted by the two uppermost bearings 4 and a plurality of rollers 10 are carried by the axle 9. On rotation of the axle 5 in the direction as indicated by the arrow 12 the continuous belt 8 is carried along by the chains 7 and generally assumes a cylindrical form as shown schematically in FIG. 1. The distance between the two pairs of bearings 3 and 4 is such that the generally cylindrical belt 8 will contact the periphery of the rollers 10 over a short arc of their circumference to form the distance in circumferential direction and is impressed in 14. As a consequence, the rollers 10 are also rotated in the direction as indicated by the arrow 13.

If bulk material is fed through the chute 11, such as earth from a digging machine for instance, it will be carried along by the belt 8 to the nip 14 between said belt 8 and the rollers 10. As a result, the bulk material will be imparted the same velocity as the belt and will be discharged from said nip in the shape of a jet. All particles now having the same velocity they are flung away to the same place. If the bulk material contains lumps of varying sizes, the belt 8 will deform inwardly by amounts to accommodate the various sizes and consequently the lumps may pass undisturbed.

A modification of the invention is shown in side view in FIG. 3, in which similar parts as in FIG. 1 are indicated by the same reference numbers. In this modification, the axle 5 is provided with the rigid roller assembly generally indicated by reference character 15.

Whereas the upper roller 18 is flexible. The rigid roller assembly 15 comprises a plurality of inflated pneumatic tires 17 secured between discs 16 fixed to the shaft 5. The driven shaft 9 carries a hub 19 to which the circumferentially spaced reinforced rubber ribbons 20 are attached and which extend to and are connected, as by the angle members 21, to the belt 8.

To increase the compressive force between the roller assemblies without increasing the speed of rotation the fastening means 21 may be weighted.

Because the flexible belt bears upon the rigid roller assembly only under the action of centrifugal force and may readily deform to accommodate for various lump sizes, the wear of the conveying devices will be minor as compared with known conveying apparatuses such as constructed with two superimposed continuous belts each guided on two or more rollers or with such a belt and a superimposed rotary drum provided with pneumatic tires.

The terms and expressions which I have employed are used as terms of description and not of limitation, and I have no intention in the use of such terms and expressions of excluding any equivalents of the features shown and described or portions thereof, but recognize that various structural modifications are possible within the scope of the invention claimed.

What I claim is:

1. In a device of the character disclosed, a framing provided with uprights, a pair of parallelly spaced roller means and means rotatably mounting said roller means to said uprights, one of said roller means comprising a flexible continuous belt, a number of flexible connecting means connecting said belt with an axle in such a way that on rotation the belt describes a general cylindrical surface around said axle and the belt will just contact the periphery of the other roller means forming a nip, means for feeding bulk material adjacent said nip formed on rotation to be discharged from between said nip by centrifugal force.

2. In a conveying apparatus of the character disclosed, a resilient surfaced roller mounted for rotation, a continuous belt connected with a rotatable hub by means of flexible connecting means, said means just being stretched between said hub and said belt for rotation of the hub whereby the belt assumes a cylindrical form and contacts the periphery of said roller over a short distance in circumferential direction, means for feeding bulk material between the surfaces of said belt and said roller.

3. The apparatus of claim 2, characterized in that the flexible connecting means are connected to the belt by means of relative heavy connecting devices to weight the belt.

4. In a conveying apparatus of the character disclosed, a resilient pneumatic roller, a hub having its axis parallel to the axis of said roller, means for rotatably mounting said roller and said hub, a plurality of chains adjacent both ends of the hub connecting said hub with a continuous belt in such a way that on rotation of the hub the belt will assume an almost cylindrical form around the axis of the hub and will contact said roller forming a nip, means for feeding bulk material between said roller and said belt adjacent said nip formed on rotation.

5. The conveying apparatus of claim 4, characterized in that said hub with said surrounding belt is generally positioned over said roller, said belt on rotation having a smaller diameter than said roller.

6. In an apparatus for conveying and stacking bulk materials, a generally cylindrical pneumatic roller means, means comprising a rotatable hub provided with a series of flexible connecting means adjacent both ends of said hub for loosely connecting said hub with a flexible continuous belt, said belt for the greater part assuming a cylindrical form under influence of the centrifugal force on rotation of said hub whereby said connecting means will become stretched like the spokes of a wheel, the belt now being generally positioned over said roller means, having a smaller diameter than said roller means and just contacting said means forming a nip between them, a chute for feeding bulk material onto the surface of said roller means adjacent said nip.

7. The apparatus of claim 6, characterized in that the flexible connecting means are connected to the belt by means of relative heavy connecting devices to weight the belt.

References Cited by the Examiner

FOREIGN PATENTS 360,237   6/1938   Italy.

EVON C. BLUNK, *Primary Examiner.*

M. L. AJEMAN, *Assistant Examiner.*